United States Patent [19]

Rendina et al.

[11] Patent Number: 4,967,390
[45] Date of Patent: Oct. 30, 1990

[54] BUS DRIVING AND DECODING CIRCUIT

[75] Inventors: Francesco Rendina, Nova Milanese; Lucio Savogin, Como, both of Italy

[73] Assignee: Bull HN Information Systems Italia S.p.A., Caluco, Italy

[21] Appl. No.: 230,636

[22] Filed: Aug. 10, 1988

[30] Foreign Application Priority Data

Sep. 16, 1987 [IT] Italy .................................. 21919 A87

[51] Int. Cl.$^5$ .............................................. G06F 3/00
[52] U.S. Cl. .............................. 364/900; 364/942.8; 364/947.1; 364/935.42
[58] Field of Search .......................... 364/900 MS File

[56] References Cited

U.S. PATENT DOCUMENTS

| | | | |
|---|---|---|---|
| 4,376,982 | 3/1983 | Bantz et al. | 364/900 |
| 4,453,229 | 6/1984 | Schaire | 364/900 |
| 4,583,193 | 4/1986 | Kraft et al. | 364/900 |

FOREIGN PATENT DOCUMENTS

| | | |
|---|---|---|
| 0181047 | 5/1986 | European Pat. Off. . |
| 0223275 | 5/1987 | European Pat. Off. . |
| 0240061 | 10/1987 | European Pat. Off. . |

OTHER PUBLICATIONS

"Customized Clock-Based Logic Design", IBM Tech. Discl. Bull., vol. 28, No. 6, Nov. '85, pp. 2623–2624.
Tetrick, R. S., "System-Level Metastability Considerations", Electro/87 and Mini/Micro Northeast, vol. 12, 1987, 3/2, pp. 1–9.

*Primary Examiner*—Thomas M. Heckler
*Attorney, Agent, or Firm*—Gerald J. Cechony; John S. Solakian

[57] ABSTRACT

Bus driving and decoding circuit for validating the decoding of signals put on the bus by said drivers, comprising a plurality of driver elements and a decoder connected to the bus, the drivers being grouped in at least two sets, each implemented in one integrated component having a control input for enabling the opening of the related driver set, the control input receiving an enabling signal which is further input to one driver in each integrated component, so as to obtain at the output of the one driver a validation signal (V1, V2) for the decoder, each validation signal having an intrinsic delay equal to the propagation delay of the related integrated component, the circuit comprising further a delay element, located upstream or downstream of driver elements which generate the validation signals, to provide each of the validation signals with an incremental delay sufficing to cover the propagation delay spread specific to the related integrated component, the decoder being enabled by the joint assertion of the validation signals.

4 Claims, 3 Drawing Sheets

BUS DRIVING AND DECODING CIRCUIT

BACKGROUND OF THE INVENTION

The present invention relates to a bus driving and decoding circuit for data processing systems.

In modern data processing systems, the bus architecture is widely used.

A plurality of active units, central processors or data input/output controllers, collectively referred to as processors may get access to a plurality of passive resources, such as memories, register banks or peripheral units, through a common bus, comprising a plurality of leads, over which each processor may put, in time sharing, addresses and commands to forward data and commands to a selected unit and to receive from it data and status signals.

The bus constitutes a shared communication path which must be used with the utmost efficiency, by reducing to a minimum the information transfer time with the twofold objective of increasing the individual processors performance in the information transfer, and of minimizing the processor contention in bus access.

At the state of the art and with components readily available on the market, the information exchange occurs with procedures which develop in the span of a few hundreds of nanoseconds.

It is therefore clear that reducing the information transfer time by a few tens of nanoseconds contributes to improve the system performances in a relevant way.

A further aspect to be considered is the fast evolution of electronic technology. Due to this fast evolution it is desirable to design and implement computer systems capable of accepting and using new components, generally faster, in order to increase system performance without requiring a substantial redesign of the product.

SUMMARY OF THE INVENTION

The present invention meets these objectives and provides a bus driving and decoding circuit which enables minimizing the time required to transfer information over a bus, to validate such information, and decode it. Moreover the circuit is "flexible" in the sense that allows for performance increase by the use of faster circuit components, which may become available, without requiring design changes.

The problem solved by the present invention consists in the following: When a processor has to put information over a common bus, typically addresses and commands, these have to be transferred through drivers which have a propagation delay spread between a minimum and a maximum.

Therefore the information units or bits are effectively present over the bus at different times, which must be taken into account by a receiving decoding network, which for instance provides to select a destination unit among several units, only when all the information bits are certainly present on the bus.

It is thus necessary to provide a validation or strobe signal, it too being transferred over the bust through a driver, the validation signal becoming available when all the information bits are certainly present.

In the state of the art this strobe signal is generated with a predetermined delay as to the information signals based on the worst propagation condition which may occur considering the design of the product and spreads resulting from mass production.

According to the invention a plurality of validation signals is generated, each being transferred on the bus through a driving element pertaining to an integrated circuit component containing other driving elements used to transfer other information units, so that the delay of each of said validation signals depends on the driver propagation delay which affects the information signals and besides being limited to a required minimum, may be intrinsically changed by the replacement of the drivers with faster ones, to match the real needs of the specific implementation and product unit.

These validation signals are used by a decoding network as conditions which must be jointly verified for validation of the information present on the bus.

DESCRIPTION OF THE DRAWING

These and other features of the invention will appear more clearly from the following description and the enclosed drawings where.

DESCRIPTION OF THE PREFERRED EMBODIMENTS

Figure 1:
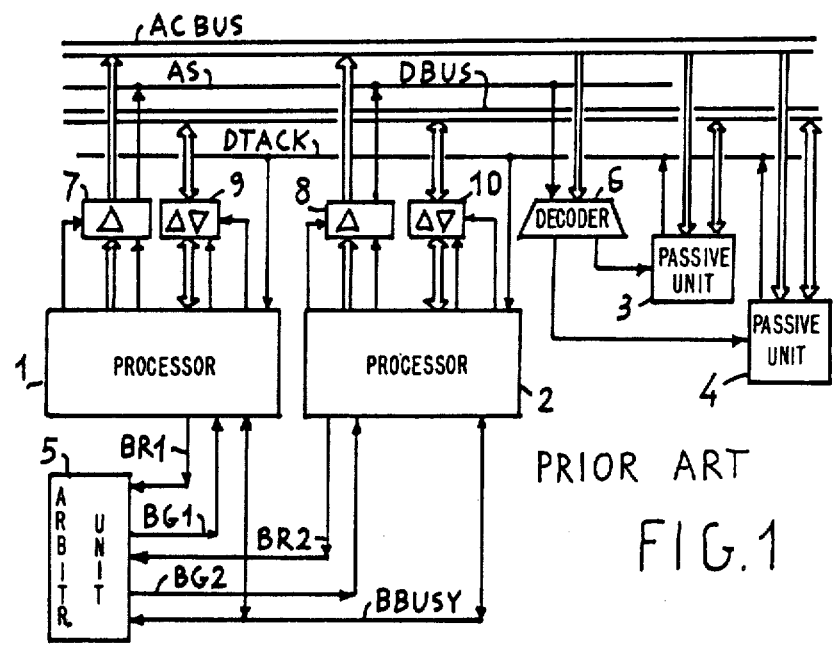
FIG. 1 is a block diagram of a prior art system architecture.

FIG. 1 is a block diagram of a prior art system architecture.

The system comprises two processors 1,2, two passive units 3,4, an arbitration unit 5 and a decoder 6.

Some driver sets 7,8, and driver/receiver sets 9,10, even if shown as separate elements, are part of units 1,2 respectively.

Units 1,2,3,4 communicate among themselves through a common bus comprising an address/command channel ACBUS, including a lead AS, individually shown, and used for the transfer of a strobe or validation signal. The common bus further comprises a data cannel DBUS for data transfer.

A lead DTACK is exemplary for a plurality of leads, which are part of the bus and are used for the transfer of timing signals.

Processors 1 and 2, through drivers 7,8 and in a mutually exclusive way, may put addresses and commands on channel ACBUS together with a signal AS.

The addresses and commands present on ACBUS channel contain information for selecting one of the two units 3,4 as a destination unit.

The selection information is received by decoder 6 together with signal AS. Decoder 6, responsive to the received information, generates one of two selection signals S1,S2, which select unit 3 and 4 respectively.

Only the selected unit is enabled to receive and interpret the received addresses and command and consequently to receive the information put on data channel DBUS by the requesting unit, or to put on data channel DBUS the information requested by unit 1 or 2.

Access to the bus is controlled by arbitration unit 5, which receives a bus access request signal BR1,BR2 from processors 1 and 2 respectively.

If the bus is not busy, the arbitration unit 5 forwards to the requesting processor (or to the one of the two which has priority, in case of concurrent requests) a response and bus granted signal BG1,BG2 respectively.

On receipt of this signal, the requesting unit puts a bus busy signal BBUSY on a common lead, and holds such signal untill the information transfer process has been completed.

Once the requesting unit has taken control of the bus, it may put the addressing and control information on channel ACBUS and the possible data information to be transferred on channel DBUS.

If the requested operation is a read, the destination unit, once selected, will put data on channel DBUS.

Figure 2:
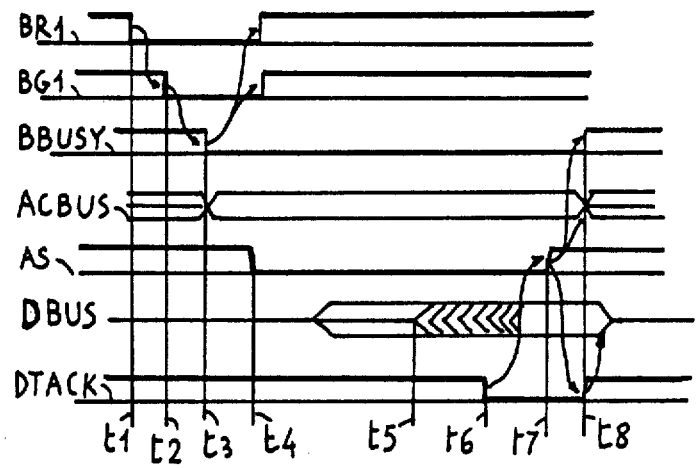
FIG. 2 is a timing diagram of the arbitration dialogue and protocol which develops in the system of FIG. 1.

FIG. 2 shows in timing diagram the arbitration and interlocked (or handshaking) protocol which develops among the requesting units (processors 1,2), the arbitration unit 5 and the destination units 3,4.

By convention a signal is asserted (logically true) when it has an electrical level 0.

At time t1, unit 1 asserts signal BR1, and requests bus access. Since the bus is not busy (signal BBUSY deasserted) the arbitration unit responds by asserting signal BG1 (time t2).

On receipt of BG1, processor 1 takes control over the bus by asserting signal BBUSY (time t3).

From this time on, unit 1 can enable drivers 7 to transfer information on channel ACBUS (diagram ACBUS) and validate the information with the subsequent assertion of signal AS (time t4).

With the assertion of BBUSY, signals BR1 and BG1 are deasserted.

At time 4 decoder 6 is enabled to receive the information present on channel ACBUS and selects a destination unit, for instance in order to perform a read operation.

At time t5, the destination unit puts the requested information on data channel DBUS and with a predetermined delay at time t6 asserts signal DTACK as validation signal.

On receipt of DTACK signal and with a predetermined delay, the requesting unit accepts the requested information and deasserts signal AS (time t7) further providing to disable drivers 7 and to deassert signal BBUSY (time t8).

In turn, the destination unit, on receipt of AS deasserted (at electrical level 1) removes the information from the data bus and deasserts signal DTACK.

In a context like the described one, the present invention relates to the driving circuits comprising the driver sets 7,8 and decoder 6 and aims to minimize the time required to validate the information put on channel ACBUS, that is the time interval t3,t4 of FIG. 2.

It has further the objective of rendering such time interval variable as a function of the effective requirements imposed by the components employed.

Figure 3:
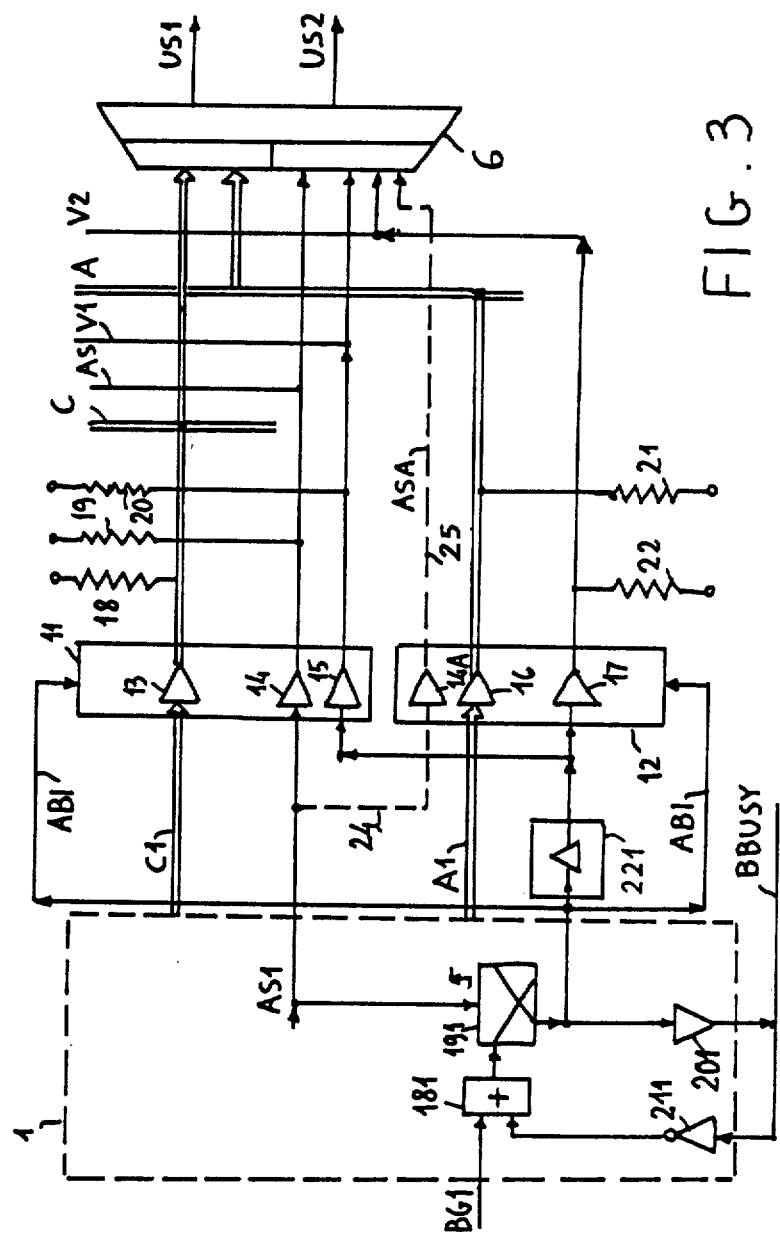
FIG. 3 is a preferred form of embodiment of the bus driving and deconding circuit of the invention.

FIG. 3 shows a preferred embodiment of the invention.

In FIG. 3 the driver set 7 of FIG. 1 comprises two integrated circuits 11,12, for instance of the type marketed with code LS245.

Each integrated circuit contains 8 drivers.

Within integrated circuit 11 six drivers are shown as a single driver 13, whilst the remaining two are individually shown as drivers 14,15.

Within integrated circuit 12, 7 drivers are shown as a single driver 16 and the eighth one is shown as driver 17.

The output of each of the drivers is connected to a pull up resistor (resistors 18,19,20,21,22) connected to a positive voltage source.

A control signal ABI, received at a control input, holds the drivers output in high impedance state when at positive electrical level (electrical level 1) and transfers the electrical level at the drivers input to their output (level 1 or 0) when ABI is at electrical level 0.

The drivers 13 have their input connected to control outputs C1 of processor 1.

The drivers 16 have their input connected to address outputs A1 of processor 1.

Within processor 1, a bus access logic is shown, by way of example in block diagram and comprises an OR gate 181, a JK flip flop 191, a driver 201, and an inverter 211.

OR gate 181 receives signals BG1 and BBUSYN (obtained from BBUSY through inverter 211) as inputs.

The output of gate 181 is connected to the set input of flip flop 191 which receives at the clock input a signal AS1 generated by processor 1.

Flip flop 191 is of the type triggered by a leading edge at the clock input.

Signal AS1, normally at 1, drops to 0 to start an operation external to processor 1, the operation implying a bus access, and rises to 1 once the operation is concluded.

Signal AS1 indicates, as long as it is at level 0, that address and command signals present at outputs C1, A1 are valid.

The inverting output QN of flip flop 191 is connected to the enabling input of integrated circuits 11,12 and provides them with signal ABI.

It is further connected to the input of a delay element 221 and to the input of driver 201, whose output is connected to lead BBUSY.

If the bus is available (BBUSY=1), the assertion of signal BG1 (BG1=0) at the input of gate 181 sets flip flop 191 so that signal ABI at the output QN drops to level 0 and causes the assertion of signal BBUSY (BBUSY=0) and the enabling of drivers from 13 to 17.

In the integrated circuit 11, driver 15 has the input connected to the output of delay element 221. In the integrated circuit 12, driver 17 has the input connected to the output of delay element 221. The input of driver 14 directly receives signal AS1 from processor 1.

The outputs of drivers from 13 to 17 are connected to a like number of leads in the communication bus, and to the inputs of decoder 6.

The inputs of decoder 6 are logically divided in two groups: selection inputs, which receive selection signals C and A and are connected to the outputs of drivers 13,16, and validation inpus, which receive signal AS, available at the output of driver 14, and signals V1,V2 available at the output of drivers 15,17 respectively.

To have signals C,A interpreted by decoder 6 it is required that signals AS,V1,V2, be all at electrical level 0.

It can be easily seen that validation at the beginning or opening is controlled essentially by V1 or V2 depending on the greater of the propagation delays of either component 11 or 12. The validation delay depends on the propagation delay of components 11,12.

In order to guarantee that signals V1,V2 are at electrical level 0 when signals C and A in output from the other drivers are certainly stable at the output it suffices that the delay element 221 provides a minimum delay not less than the spread of the propagation delay of the drivers within the same integrated component.

This spread, compared with the propagation delay of the component is minimum.

Therefore as a delay element 221 a very fast active component may be used, such as for instance an AND gate of the type FAST 74F08, having both inputs connected to the output QN of flip flop 191 (or having one input permanently connected to 1).

As an alternative an inverting element may be used such as inverter 74F04 having input connected to the direct output Q of flip flop 191 instead of output QN.

Active elements of this kind have a propagation delay in the order of 2 nsec and a maximum propagation delay in the order of 6 nsec.

The delay in validating decoder 6 is therefore very small and variable as a function of components used as drivers.

Thus, by way of example, if drivers 11,12 are of the type ALS245A, they have a minimum propagation delay tpzlm of 5 nsec and a maximum propagation delay tpzlM of 20 nsec.

In other words, an electrical level 0 propagates to the output, with a delay, from the instant at which the driver is enabled, which spans from 5 to 20 nsec., depending on the integrated component unit.

Within the same integrated circuit component, however, at equal load condition of the different drivers, the spread in the propagation delay is minimum and in the order of 10% or less of the propagation delay.

In other words, in the optimal case in which a component has a propagation delay of about 5 nsec, the propagation delay of the drivers in the same component may span from 5 to 5.5 nsec.

In the worst case, the propagation delay of the drivers in the same component may span from 18 to 20 nsec.

In order to guarantee a correct validation of decoder 6 it suffices that the delay element 221 produces a delay not lesser than 2 nsec., for instance with a variability range from 2 to 6 nsec.

The result is that the delay in validation of the decoder is at maximum 26 nsec, but, depending on case may range from product unit to product unit down to a minimum of 7 nsec., the several units being still perfectly operative.

In the prior art approach, on the contrary, a single validation signal AS is generated with a delay greater than the maximum propagation delay of the components.

Therefore an active delay component has to be used which must have a minimum propagation delay of 20 nsec and correspondingly may have a maximum propagation delay of 40 nsec or even more.

Therefore the advantage of the invention is quite evident.

Figure 4:
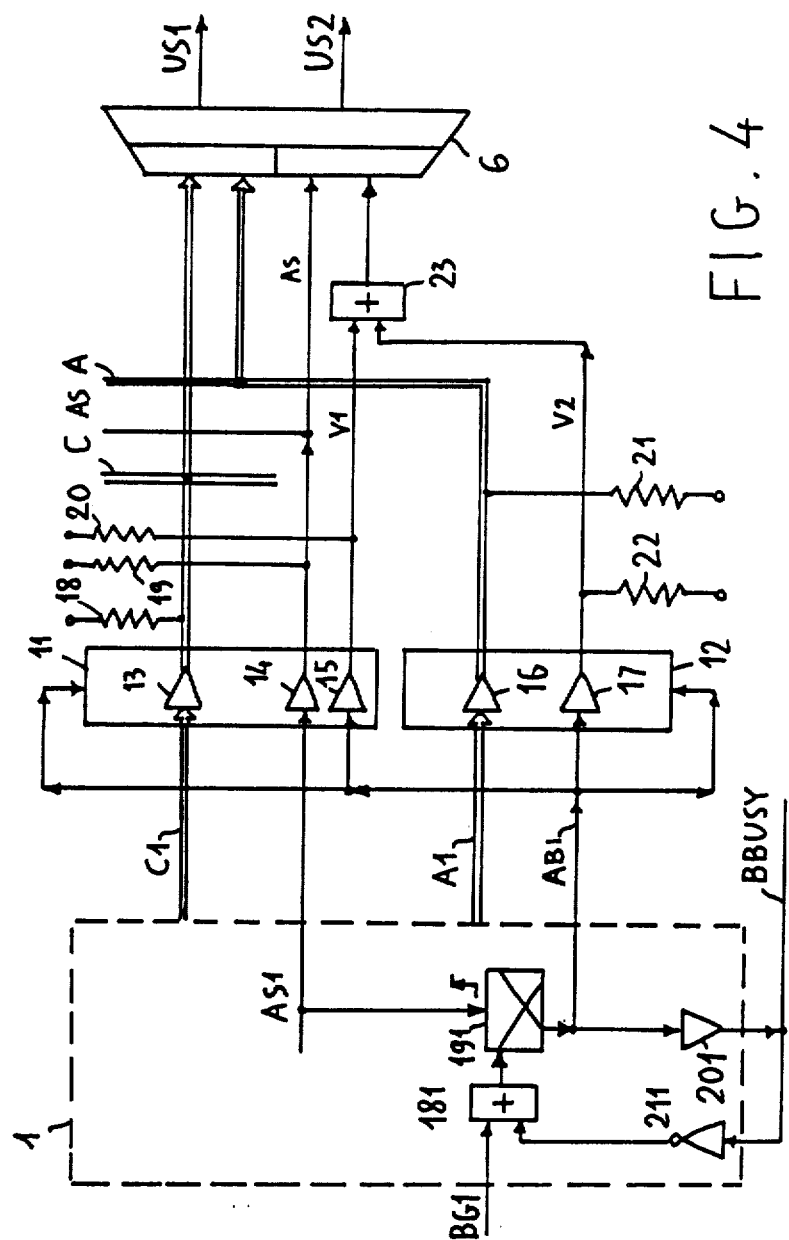
FIG. 4 is another form of embodiment of the bus driving and decoding circuit of the invention.

FIG. 4 shows an embodiment alternative to the one of FIG. 3. In FIG. 3 the delay element 221 is located upstream of drivers 15,17. In FIG. 4, the delay element, referenced as 23 is located downstream and consists for instance of an OR gate of the FAST type, whose inputs receive signals V1,V2 and whose output is connected to a validation input of decoder 6.

FIG. 4 differs from FIG. 3 only for the location of the delay element 23.

Therefore either corresponding elements are referenced with the same numeral.

In conclusion the invention is based on the concept of generating a plurality of validation signals (V1,V2), one for each integrated component (such as 11 and 12), which is used to transfer signals (such as C and A) which must be validated, the validation signals being then too transferred through the corresponding integrated circuit and having a delay, obtained through a delay element located upstream or downstream of the transferring integrated circuit, the delay sufficing to cover the spread in the propagation delay of the elements within the same integrated component.

Validation is performed by the joint assertion of the several validation signals.

It is clear that in the described embodiment the joint assertion occurs when both signal V1,V2 are at electrical level 0.

However nothing prevents one from using direct logic, where the assertion of a signal corresponds to an electrical level other than zero, for instance a positive level.

In this case gate OR 23 has to be replaced with an AND gate.

Further, if validation signal are asserted when at level 0 and decoder 6 is enabled by a level 1, the OR gate 23 will have to be replaced by a NOR gate or by a NAND gate if the choosen assertion level is 1 and the decoder enabling level is 0.

Referring to FIG. 3, it remains to consider the validation function of signal AS1.

Whilst signals V1,V2 assure validation of signals A and C present on the BUS when the several drivers are enabled, signal AS obtained from AS1 through driver 14 guarantees the invalidation of signals A and C on the BUS before the several drivers are disabled.

The disabling of the several drivers is not simultaneous, even if sumultaneously controlled, but is affected by a propagation delay which is different from component to component.

The earlier deassertion of validation signal AS1, hence of signal AS, inhibits decoder 6 from the wrong decoding of a transient state present on the BUS.

For signal AS1 the same considerations developed for V1,V2 may be repeated.

Thus if signal AS1 is transferred by one among a plurality of integrated components such as 11 and 12 it is required that its deassertion occurs sufficiently in advance so as to precede the disabling of all the drivers 13,17 and to cover the possible propagation delay spread of components 11,12 when they are disabled.

This lead time may be assured by the propagation delay of flip flop 191.

In order to minimize such lead time, it is possible to transfer signal AS1 on the BUS through a driver such as 14 for each integrated circuit component which drives the BUS.

In this case signal AS1 is required to have a lead time sufficing to cover the propagation delay spread at disabling of the drivers within the same integrated circuit component.

In FIG. 3 this alternative is shown as implemented by the dotted connection lines 24,25 and by driver 14A.

What is claimed is:

1. A bus driving and decoding circuit for putting on a bus of a data processing system a set of binary signals and for decoding said set of signals put on said bus, at least one said set of signals including validated signal which has a minimum propagation delay, comprising a plurality of driver elements coupled to said bus, each said driver element having a signal output coupled to said bus for inputting one of said binary signals on said bus, and a decoder coupled to said bus and having inputs connected to said bus for receiving said set of signals, said plurality of drivers comprising at least two sets, each set being implemented in a single integrated component, each integrated component having a control input for enabling the transfer at the output of the drivers in said set of signals input to said driver set, with a propagation delay intrinsically equal in all drivers of said driver set and a minimum spread from driver to driver of said driver set, characterized in that said circuit comprises:

first means for jointly applying an enabling signal (ABI) to said control input of said integrated components and to the input of a first driver in each set, to obtain as output from said first driver in each set a validation signal (V1,V2) which is input to said decoder, said validation signal having a delay intrinsically equal to the propagation delay of the related set, and delay means upstream or downstream from said first driver of each set to provide each of said validation signals to said decoder with an incremental delay sufficing to overlap the propagation delay spread of the related driver set, said decoder being enabled by the joint assertion of said validation signals.

2. A bus driving and decoding circuit as claimed in claim 1, wherein said delay means is located downstream of said first driver of each set and consists of a logic gate (OR,AND,NOR,NAND).

3. A bus driving and decoding circuit as claimed in claim 1, wherein a second driver of at least one of said driver sets receives as input a further enabling signal (AS1) to obtain at the output of said second driver a further validation signal (AS) for said decoder, the transition of said further enabling signal (AS1) from asserted to deasserted causing the subsequent and delayed removal of said enabling signal (ABI) so that said further validation signal (AS) is deasserted and inhibits said decoder before said drivers are disabled.

4. A bus driving and decoding circuit as claimed in claim 3 wherein said further enabling signal (AS1) is input to a second driver of each of said driver sets, to obtain at the output of said second driver of each set a validation signal (AS, ASA) for said decoder.

* * * * *